United States Patent
Deng

(10) Patent No.: US 9,634,712 B1
(45) Date of Patent: Apr. 25, 2017

(54) MOBILE PHONE COVER

(71) Applicant: Shenzhen Fengxian Investment Development Co., Ltd., Guangdong (CN)

(72) Inventor: Xiuhong Deng, Guangdong (CN)

( * ) Notice: Subject to any disclaimer, the term of this patent is extended or adjusted under 35 U.S.C. 154(b) by 0 days.

(21) Appl. No.: 15/257,936

(22) Filed: Sep. 7, 2016

(51) Int. Cl.
| | | |
|---|---|---|
| *H04B 1/38* | (2015.01) | |
| *H04B 1/3888* | (2015.01) | |
| *A45C 11/00* | (2006.01) | |

(52) U.S. Cl.
CPC ............ *H04B 1/3888* (2013.01); *A45C 11/00* (2013.01); *A45C 2011/002* (2013.01)

(58) Field of Classification Search
CPC .. H04B 1/3888; A45C 11/00; A45C 2011/002
See application file for complete search history.

(56) References Cited

U.S. PATENT DOCUMENTS

| | | | | |
|---|---|---|---|---|
| 2011/0309728 | A1* | 12/2011 | Diebel | H04B 1/3888 312/293.1 |
| 2012/0037524 | A1* | 2/2012 | Lonsdale, II | G06F 1/1626 206/320 |
| 2015/0133204 | A1* | 5/2015 | Ivanovski | H04B 1/3816 455/575.8 |

* cited by examiner

*Primary Examiner* — Nguyen Vo
(74) *Attorney, Agent, or Firm* — Prakash Nama; Global IP Services, PLLC

(57) ABSTRACT

Disclosed is a mobile phone cover, comprising a protective plate, a middle frame body and a flexible rubber bottom cap, wherein the protective plate is sealed above the middle frame body; the middle frame body comprises a hard rubber frame, a flexible rubber frame and a shockproof belt; the flexible rubber frame is disposed on the outer sides of the hard rubber frame; the shockproof belt is disposed on the inner sides of the hard rubber frame and partly penetrates the hard rubber frame to be connected and fixed with flexible rubber frame; the hard rubber frame partly extends outs of the outer sides of the flexible rubber frame and forms an anti-skidding belt; and the flexible rubber bottom cap is provided with a sealing groove matched with the sealing flange. The present invention has waterproof, dust-proof and shockproof functions, and has a feature of high stability.

8 Claims, 4 Drawing Sheets

MOBILE PHONE COVER

BACKGROUND OF THE INVENTION

The present invention relates to the technical field of mobile phone accessories, in particular to a mobile phone cover.

Along with the rapid development of mobile Internet, mobile phones have become necessary articles of daily use for people. Mobile phones are used for shopping, talking and playing games online. Replacing computers, mobile phones are used more and more often. Protection for mobile phones is needed in use, so mobile phone covers have been invented. Existing mobile phone covers have single protective functions.

BRIEF SUMMARY OF THE INVENTION

Aiming at the above technical problems, the present invention provides a mobile phone cover with a plurality of protective functions.

The present invention employs the following technical solution: A mobile phone cover includes a protective plate, a middle frame body and a flexible rubber bottom cap, wherein the protective plate is sealed above the middle frame body; the middle frame body consists of a hard rubber frame, a flexible rubber frame and a shockproof belt; the flexible rubber frame is disposed on the outer sides of the hard rubber frame; the shockproof belt is disposed on the inner sides of the hard rubber frame and partly penetrates the hard rubber frame to be connected and fixed with the flexible rubber frame; the hard rubber frame partly extends out of the outer sides of the flexible rubber frame and forms an anti-skidding belt; the hard rubber frame is provided with a sealing flange along the lower side thereof; and the flexible rubber bottom cap is provided with a sealing groove matched with the sealing flange.

Optimally, the sealing groove of the flexible rubber bottom cap is stack-molded with silica gel.

Optimally, the hard rubber frame is provided with accommodating grooves on the inner sides, and the shockproof belt is disposed in the accommodating grooves.

Optimally, the flexible rubber bottom cap includes flexible rubber bottom cap strips; hollowed plates are alternatively disposed up and down between the flexible rubber bottom cap strips; sealing plates are disposed between the hollowed plates; and the sealing plates are embedded into the flexible rubber bottom cap strips.

Optimally, the hard rubber frame has through-holes; the flexible rubber frame has key pressing portions; and the key pressing portions penetrate the through-holes and extend into the inner sides of the hard rubber frame.

Optimally, the hard rubber frame has a platform on the top side; the platform extends toward the inner side; projections are disposed at the upper end of the flexible rubber frame; the projections are disposed along the top side of the platform; and the protective plate is supported and sealed by the platform and has edges inserted into the projections.

Optimally, shock-absorption grooves are disposed at the four outside corners of the hard rubber frame; corresponding shock-absorption projections are disposed at the four inside corners of the flexible rubber frame; and the shock-absorption projections are disposed in the shock-absorption grooves.

Optimally, the hard rubber frame is provided with a notch for facilitating opening and closing of the flexible rubber bottom cap at a position of the surface contacting the flexible rubber bottom cap.

According to defects in the prior art, the present invention has made a creative design. The present invention provides a mobile phone cover with a plurality of protective functions, having the following beneficial effects: the utility model has a plurality of functions, including waterproof and dust-proof functions and multilevel shockproof functions, and has characteristics of high steadiness and high stability.

DETAILED DESCRIPTION OF THE INVENTION

Figure 1:
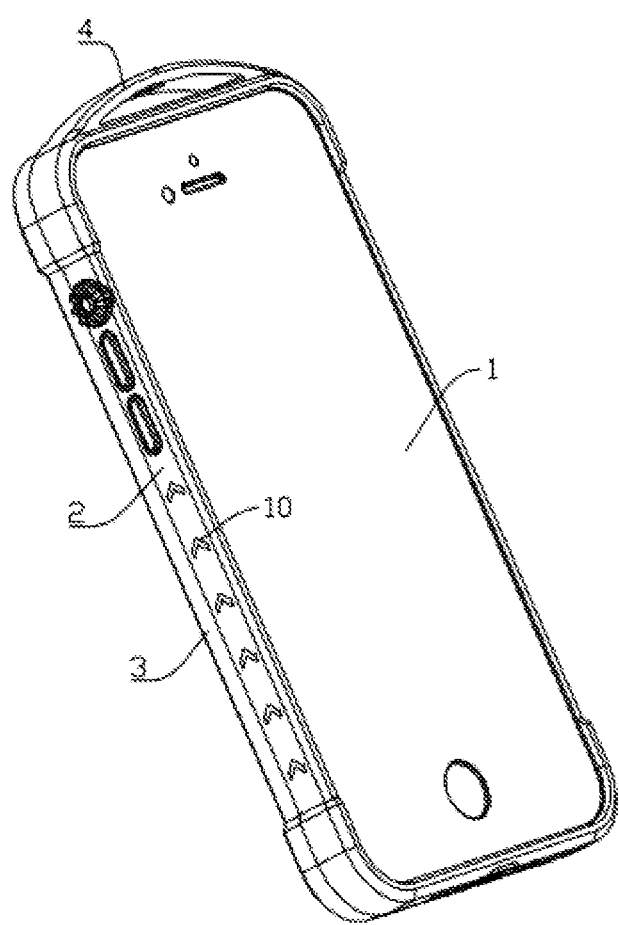
FIG. 1 is a space diagram of the present invention.
Figure 2:
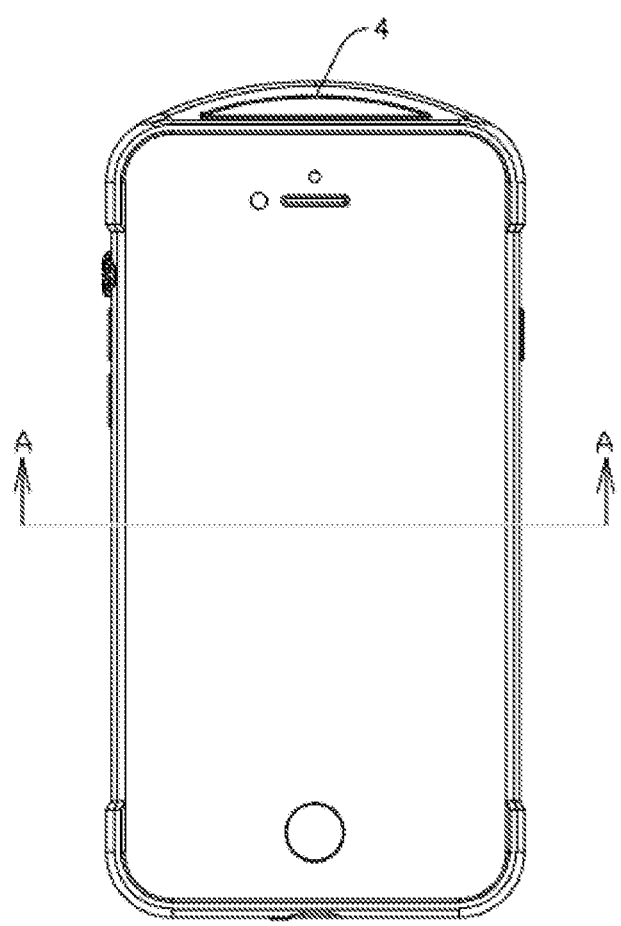
FIG. 2 is a top view of the present invention.
Figure 3:
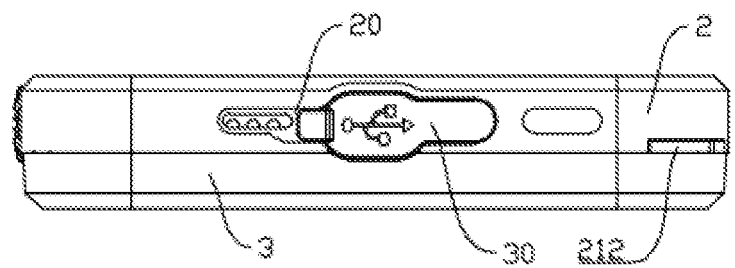
FIG. 3 is a front view of the present invention.
Figure 4:
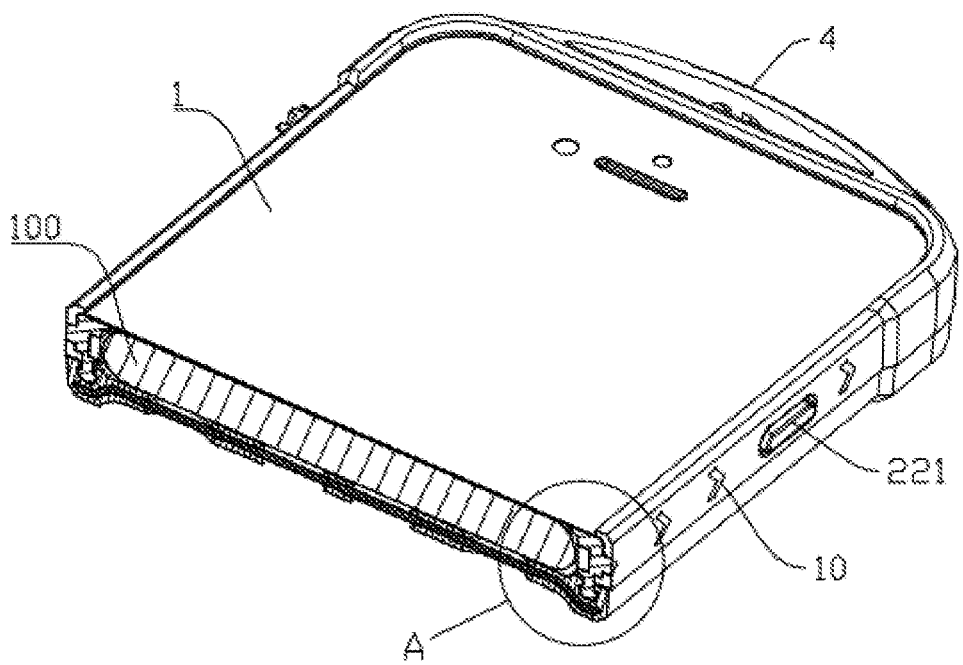
FIG. 4 is a space sectional view of A-A face in FIG. 2.
Figure 5:
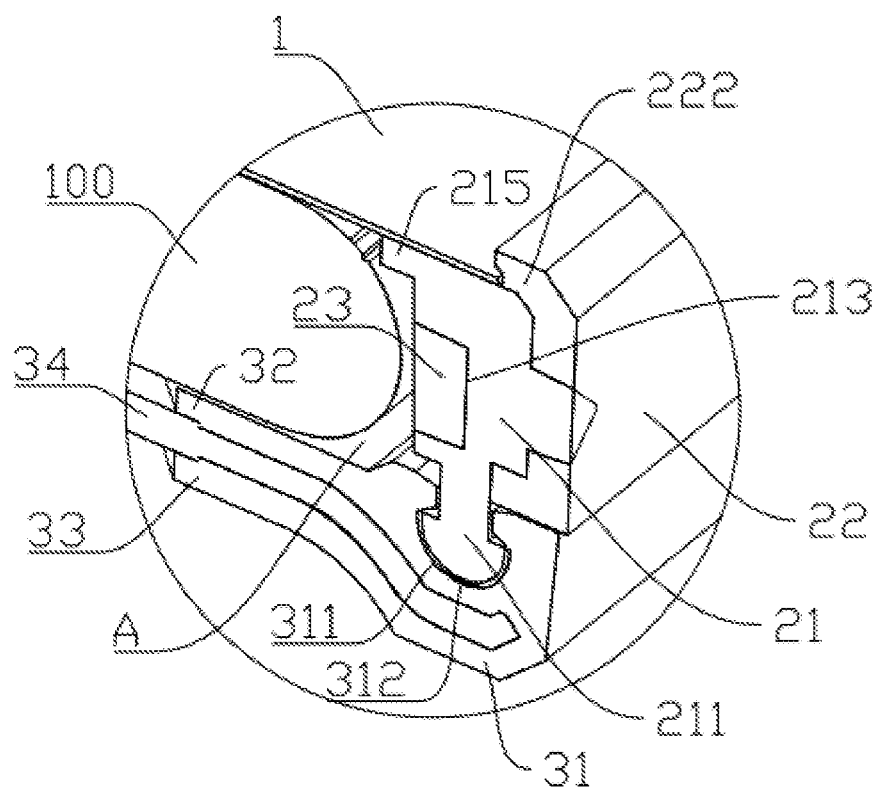
FIG. 5 is an amplified view of position A in FIG. 4.

The present invention is described in detail below in conjunction with the attached drawings. It is understandable that the following describe the specific implementation mode of the present invention, and do not limit the protective scope of the present invention.

As shown in FIGS. 1-6, a mobile phone cover mainly includes a protective plate 1, a middle frame body 2 and a flexible rubber bottom cap 3. The protective plate 1 is sealed above the middle frame body 2. The middle frame body 2 consists of a hard rubber frame 21, a flexible rubber frame 22 and a shockproof belt 23. The flexible rubber frame 22 is disposed on the outer sides of the hard rubber frame 21. The shockproof belt 23 is disposed on the inner sides of the hard rubber frame 21 and partly penetrates the hard rubber frame 21 to be connected and fixed with the flexible rubber frame 22. The hard rubber frame 21 partly extends out of the outer sides of the flexible rubber frame and forms an anti-skidding belt 10. The hard rubber frame 21 is provided with a sealing flange 211 along the lower side thereof. The flexible rubber bottom cap 3 is provided with sealing grooves 311 matched with the sealing flanges 211. In order to facilitate opening and closing of the flexible rubber bottom cap 3, the hard rubber frame 21 is provided with a notch 212 at a position of the surface contacting the flexible rubber bottom cap 3. The notch 212 can be disposed at any one of four corners of the hard rubber frame 21. In order to facilitate suspending of the mobile phone cover or decorating with accessories, the flexible rubber frame 22 is provided with a suspending portion 4.

The sealing flange 211 and the sealing grooves 311 form seals on a plurality of surfaces. The sealing grooves 311 are stack-molded with silica gel 312. Of course, other flexible stack-molding gel can be used. The seals have an improved waterproof effect, a very good waterproof structure, and a waterproof grade to 3-5M.

The embodiment provides a mobile phone cover. The mobile phone cover mainly includes three parts, namely a protective plate 1, a middle frame body 2 and a flexible rubber bottom cap 3. The middle frame body 2 is a protective frame for a mobile phone. Specifically, the middle frame body 2 consists of a hard rubber frame 21, a flexible rubber frame 22 and a shockproof belt 23. The hard rubber frame 21 serves as a reinforcing frame. The hard rubber frame 21 is entirely disposed on the inner sides of the flexible rubber frame 22, which means that, the flexible rubber frame 22 entirely wraps the periphery of the hard rubber frame 21. The shockproof belt 23 is disposed on the inner sides of the hard rubber frame 21 and is connected and fixed with the flexible rubber frame 22. The hard rubber frame 21 partly extends out of the outer sides of the flexible rubber frame 22 and forms an anti-skidding belt 10, capable of improving the anti-skidding performance of mobile phone sides and capable of improving adhesion of the flexible rubber frame 22 to the outer sides of the hard rubber frame 21. If a mobile phone falls down, the flexible rubber frame 22 on the outer sides performs the primary shock vibration; then the hard rubber frame 21 strengthens the protection; and the shock to the mobile phone 100 in the cover is further absorbed by the shockproof belt 23, so the mobile phone 100 achieves an improved shockproof effect. Moreover, the shockproof belt 23 is connected with the flexible rubber frame 22 such that the three parts, namely the hard rubber frame 21, the flexible rubber frame 22 and the shockproof belt 23, form a fixed body, capable of preventing reduction of the shockproof effect due to displacement and sliding of the three parts, which occur after the mobile phone 100 falls down. The flexible rubber bottom cap 3 is removable sealed on the lower side of the hard rubber frame 21 such that the protective plate 1, the middle frame body 2 and the flexible rubber bottom cap 3 form a sealing space A capable of sealing a mobile phone.

Accommodating grooves 213 are disposed on the inner sides of the hard rubber frame 21. The shockproof belt 23 is disposed in the accommodating grooves 213. The design of the accommodating grooves 213 can improve the space utilization rate, ensuring that the mobile phone cover is not big and awkward. The design of the accommodating grooves 213 can also ensure that the shockproof belt 23 is stably positioned on the inner sides of the hard rubber frame 21 without shaking, improving the positioning stability and shockproof stability of a mobile phone.

The flexible rubber bottom cap 3 includes flexible rubber bottom cap strips 31. Hollowed plates are alternatively disposed up and down between the flexible rubber bottom cap strips 31. Sealing plates 34 are disposed between the hollowed plates. The sealing plates 34 are embedded into the flexible rubber bottom cap strips. The hollowed plates which are alternatively disposed up and down specifically consist of upper hollowed plates 32 and lower hollowed plates 33. The upper hollowed plates 32 are disposed in the sealing space A, while the lower hollowed plates 33 are disposed on the outer surface. The upper hollowed plates 32 can intensify the friction of the mobile phone 100 with the inner sides of a sealing sleeve, providing stability for the mobile phone 100. The lower hollowed plates 33 can make the cover more beautiful, and more importantly, when the cover is held by hand, the lower hollowed plates 33 can increase friction between the cover and the palm. The sealing plates 34 positioned between the upper hollowed plates 32 and the lower hollowed plates 33 can be fixed by pins which connect the upper and lower hollowed plates.

The hard rubber frame 21 has through-holes. The flexible rubber frame 22 is provided with key pressing portions 221. The key pressing portions 221 penetrate the through-holes and extend into the inner sides of the hard rubber frame 21. At some interfaces of the mobile phone 100, for example a charge interface and a headphone jack, the middle frame body 2 is integrally provided with inserting holes 20. The inserting holes 20 are respectively provided with padding 30. The padding 30 is in movable connection with the middle frame body 2. A camera and a flashlight of a mobile phone are usually disposed on the back of the mobile phone, so the flexible rubber bottom cap is provided with a light-transmitting waterproof plate, and the light-transmitting waterproof plate seals the flexible rubber bottom cap.

The hard rubber frame 21 has a platform 215 on the top side. The platform 215 is formed along the circumference of the hard rubber frame. The platform 215 extends into the sealing space A and is positioned at the upper edge of the mobile phone 100 in the sealing space A. The platform 215 has an inner face which prevents upward movement. The protective plate 1 is supported and sealed by the platform 215, ensuring that when the mobile phone 100 is placed in a sealed cover, the protective plate 1 closely fits the surface of a touch screen of the mobile phone 100, bringing convenience to touching of the mobile phone through the protective plate. Projections 222 are disposed at the upper end of the flexible rubber frame 22. The projections 222 are disposed along the top side of the platform 215. The protective plate 1 is inserted into the projections 222 of the flexible rubber frame 22. The projections of the flexible rubber frame 22 have the advantage that the protective plate 1 closely fits the touch screen of the mobile phone 100, so when the mobile phone 100 falls face down, the projections 222 touch the ground first and play a buffering effect, ensuring that the protective plate 1 does not touch the ground. On the one hand, the protective plate 1 is not worn during falling, and on the other hand, it is ensured that the front face of the mobile phone 100 does not touch the ground and crash.

Further, the two ends of the cover can be thickened. As shown in FIG. 1, by the thickening treatment at the front end and the rear end of the cover, the shockproof grade can reach 3M.

Figure 6:
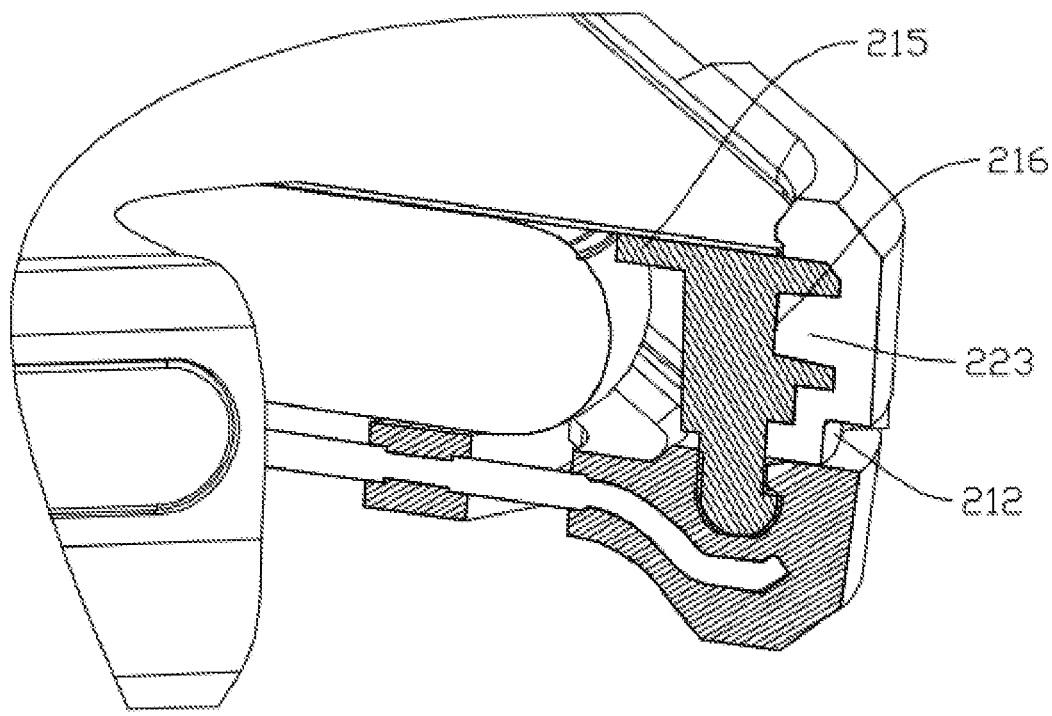
FIG. 6 is an angular sectional view of the present invention.

As shown in FIG. 6, shock-absorption grooves 216 are disposed at the four outside corners of the hard rubber frame 21, and corresponding shock-absorption projections 223 are disposed at the four inside corners of the flexible rubber frame 22. The shock-absorption projections 223 are disposed in the shock-absorption grooves 216. When the mobile phone 100 falls down with any one of the four corners touching the ground first, the mobile phone tends to crash. The shock-absorption grooves 216 and the shock-absorption projections 233 play a role in a way that, the shock-absorption projections 233 of the flexible rubber frame 22 are thickened and then have a better shock-absorption effect than other positions of the flexible rubber frame, so the four corners provide the mobile phone with better protection.

The embodiment of the present invention aims to describe the specific implementation mode and does not limit the protective scope of the present invention. Those skilled in this field can make some modifications on the basis of the embodiment, and all equivalent changes or modifications made according to the present invention shall fall within the protective scope of the claims of the present invention.

What is claimed is:

1. A mobile phone cover, characterized by comprising a protective plate, a middle frame body and a flexible rubber bottom cap, wherein the protective plate is sealed above the middle frame body; the middle frame body consists of a hard rubber frame, a flexible rubber frame and a shockproof belt; the flexible rubber frame is disposed on the outer sides of the hard rubber frame; the shockproof belt is disposed on the inner sides of the hard rubber frame and partly penetrates the hard rubber frame to be connected and fixed with the flexible rubber frame; the hard rubber frame partly extends out of the outer sides of the flexible rubber frame and forms an anti-skidding belt; the hard rubber frame is provided with a sealing flange along the lower side thereof; and the flexible rubber bottom cap is provided with a sealing groove matched with the sealing flange.

2. The mobile phone cover according to claim 1, wherein the sealing groove of the flexible rubber bottom cap is stack-molded with silica gel.

3. The mobile phone cover according to claim 1, wherein the hard rubber frame is provided with accommodating grooves on the inner sides, and the shockproof belt is disposed in the accommodating grooves.

4. The mobile phone cover according to claim 1, wherein the flexible rubber bottom cap comprises flexible rubber bottom cap strips; hollowed plates are alternatively disposed up and down between the flexible rubber bottom cap strips; sealing plates are disposed between the hollowed plates; and the sealing plates are embedded into the flexible rubber bottom cap strips.

5. The mobile phone cover according to claim 1, wherein the hard rubber frame has through-holes; the flexible rubber frame is provided key pressing portions; and the key pressing portions penetrate the through-holes and extend into the inner sides of the hard rubber frame.

6. The mobile phone cover according to claim 1, wherein the hard rubber frame has a platform on the top side; the platform extends toward the inner side; projections are disposed at the upper end of the flexible rubber frame; the projections are disposed along the top side of the platform; and the protective plate is supported and sealed by the platform and has edges inserted into the projections.

7. The mobile phone cover according to claim 1, wherein shock-absorption grooves are disposed at the four outside corners of the hard rubber frame; corresponding shock-absorption projections are disposed at the four inside corners of the flexible rubber frame; and the shock-absorption projections are disposed in the shock-absorption grooves.

8. The mobile phone cover according to claim 1, wherein the hard rubber frame is provided with a notch for facilitating opening and closing of the flexible rubber bottom cap at a position of a surface contacting the flexible rubber bottom cap.

* * * * *